(12) United States Patent
Palmer et al.

(10) Patent No.: US 7,249,934 B2
(45) Date of Patent: Jul. 31, 2007

(54) PATTERN COOLED TURBINE AIRFOIL

(75) Inventors: Nicholas Charles Palmer, Loveland, OH (US); Kevin Lee Kirkeng, Milford, OH (US); Ching-Pang Lee, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 131 days.

(21) Appl. No.: 11/216,647

(22) Filed: Aug. 31, 2005

(65) Prior Publication Data
US 2007/0048133 A1    Mar. 1, 2007

(51) Int. Cl.
*F01D 5/18* (2006.01)
(52) U.S. Cl. .................................... 416/97 R
(58) Field of Classification Search ............. 416/96 R, 416/97 R; 415/115
See application file for complete search history.

(56) References Cited

U.S. PATENT DOCUMENTS

| | | | |
|---|---|---|---|
| 4,197,443 A | 4/1980 | Sidenstick | |
| 4,601,638 A | 7/1986 | Hill et al. | |
| 4,653,983 A | 3/1987 | Vehr | |
| 4,664,597 A | 5/1987 | Auxier et al. | |
| 4,669,957 A | 6/1987 | Phillips et al. | |
| 4,672,727 A | 6/1987 | Field | |
| 4,738,588 A | 4/1988 | Field | |
| 4,762,464 A | 8/1988 | Vertz et al. | |
| 5,271,715 A | 12/1993 | Zelesky et al. | |
| 6,179,565 B1 * | 1/2001 | Palumbo et al. | ......... 416/97 R |
| 6,206,638 B1 | 3/2001 | Glynn et al. | |
| 6,243,948 B1 * | 6/2001 | Lee et al. | .................. 29/889.1 |
| 6,354,797 B1 | 3/2002 | Heyward et al. | |
| 6,494,678 B1 * | 12/2002 | Bunker | ..................... 416/97 R |
| 6,514,037 B1 | 2/2003 | Danowski et al. | |
| 6,554,572 B2 | 4/2003 | Rinck et al. | |
| 6,742,987 B2 | 6/2004 | Correia et al. | |

FOREIGN PATENT DOCUMENTS

EP    0 913556 A2    5/1999

OTHER PUBLICATIONS

GE Aircraft Engines, Turbine Blade A, in public use more than one year before Aug. 1, 2003, one page.
GE Aircraft Engines, Turbine Blade B in public use more than one year before Aug. 1, 2003, one page.
GE Aircraft Engines, Turbine Blade C, in public use more than one year before Aug. 1, 2003, two pages.
GE Aircraft Engines, Turbine Blade D, on sale more than one year before Aug. 1, 2003, one page.
GE Aircraft Engines, Turbine Blade E, in public use and on sale more than one year before Aug. 1, 2005, one page.
U.S. Appl. No. 10/991,805; filed Nov. 18, 2004, "Multiform Film Cooling Holes," Ching-Pang Lee.
U.S. Appl. No. 10/664,649; filed Sep. 17, 2003, "Teardrop Film Cooled Blade," R.J. Heeg et al.

\* cited by examiner

*Primary Examiner*—Ninh H. Nguyen
(74) *Attorney, Agent, or Firm*—William S. Andes; Francis L. Conte

(57) ABSTRACT

A hollow turbine airfoil includes pressure and suction sidewalls extending in span between a root and tip and extending in chord between opposite leading and trailing edges. The pressure sidewall includes a first pattern of first holes distributed in span and chord over a majority thereof, and a second pattern of different second holes also distributed in span and chord over a minority of the pressure sidewall between the tip and the midspan of the airfoil.

25 Claims, 4 Drawing Sheets

PATTERN COOLED TURBINE AIRFOIL

BACKGROUND OF THE INVENTION

The present invention relates generally to gas turbine engines, and, more specifically, to turbine rotor blades therein.

In a gas turbine engine, air is pressurized in a compressor and mixed with fuel in a combustor for generating hot combustion gases. A high pressure turbine (HPT) follows the combustor and extracts energy from the combustion gases for powering the compressor. A low pressure turbine (LPT) follows the HPT and extracts additional energy from the combustion gases for powering an upstream fan in an aircraft turbofan engine application, or powers an external drive shaft for marine and industrial applications.

The turbines are arranged in stages including a stationary turbine nozzle having a row of vanes which direct the combustion gases into a corresponding row of turbine rotor blades. Each vane has an airfoil configuration extending radially in span between inner and outer bands which bound the combustion gases.

Each turbine blade includes an airfoil extending radially in span from a root at an integral platform which in turn extends from an integral dovetail for mounting the blade in a corresponding dovetail slot in the perimeter of a supporting rotor disk. The platform defines the inner boundary for combustion gases, and the radially outer tip of the airfoil is spaced closely adjacent to a surrounding turbine shroud that defines the outer boundary for the combustion gases.

The corresponding airfoils of the vanes and blades in each turbine stage have generally concave pressure sides and generally convex suction sides extending axially in chord between opposite leading and trailing edges for efficiently turning the combustion gases and extracting energy therefrom during operation. The differently shaped opposite sides of the airfoils therefore effect different velocity and pressure distributions thereover, and correspondingly experience different heat loads from the combustion gases in highly complex three dimensional (3D) distributions.

The first stage turbine nozzle and blades first receive the combustion gases from the combustor and therefore have the greatest heat loads of the various turbine stages. Accordingly, the vanes and blades are typically cast from state-of-the-art superalloy metals which have enhanced strength at elevated temperature for maximizing the useful life thereof during operation.

The vane and blade airfoils are hollow and include corresponding internal cooling circuits therein which receive a portion of the pressurized air bled from the compressor for cooling thereof during operation. The internal cooling circuits typically include multiple radial channels defined by corresponding radial partitions bridging the pressure and suction sides of the airfoil, and those sides typically include radial rows or columns of film cooling holes extending transversely therethrough.

The cooling holes have various configurations and are typically tailored for the specific location of the airfoil from root to tip and between leading and trailing edges and on the opposite pressure and suction sides of the airfoil. For example, the leading edge of the airfoil first receives the hot combustion gases and typically has several columns of showerhead and gill holes for providing convection cooling through the sidewalls and external film cooling from the discharged cooling air.

The pressure and suction sides typically also include additional columns of film cooling holes for re-energizing the external film of cooling air as it flows downstream toward the trailing edge.

The typical film cooling hole is cylindrical and suitably drilled through the sidewall of the airfoil at a shallow inclination angle resulting in an oval inlet inside the airfoil and oval outlet on the external surface of the airfoil. Cooling air is discharged through the film cooling hole as a small jet that creates a thin film downstream therefrom for providing a thermally insulating layer of air outside the airfoil. The individual holes in the columns have a close spacing or pitch for maintaining lateral continuity of the cooling film.

The trailing edge of each airfoil may have a dedicated column of cooling holes located along the trailing edge itself between the pressure and suction sides, or commonly along the pressure side of the airfoil immediately upstream of the trailing edge for providing dedicated cooling of the thin trailing edge.

Since the turbine blade rotates during operation on the perimeter of the supporting rotor disk, it is subject to substantial centrifugal force which in turn creates centrifugal stress in the blade, and the combustion gases are subject to substantial radial forces as they flow generally downstream in the axial direction past the turbine airfoils. The rotating turbine airfoils therefore experience substantially different velocity and pressure distributions of the combustion gases as opposed to the stationary nozzle vanes.

In particular, the blade tips are bathed in the combustion gases not only along the pressure and suction sides, but also along the radially outer edge thereof as the combustion gases leak past the airfoil tips in the small clearance with the surrounding turbine shroud. The airfoil tips typically include small radial extensions of the pressure and suction sidewalls that define a squealer rib extending radially outwardly from the tip floor which encloses the internal cooling circuit of the blade.

The tip floor typically includes additional cooling holes that discharge cooling air into the small tip cavity bounded by the surrounding squealer rib. And, the pressure side of the airfoil may include another row of film cooling holes immediately below the squealer rib for local cooling of the airfoil tip itself.

Typical turbine vanes and blades have corresponding airfoil configurations which increase in width downstream from the leading edge to a maximum thickness closely adjacent thereto and then converge and taper in thickness to a thin trailing edge. The airfoils also extend in radial span between their inner and outer ends in the different configurations of the vanes and blades.

Correspondingly, the combustion gases discharged from the annular combustor have a center biased peak in temperature with corresponding pattern and profile factors varying in temperature circumferentially and radially. The combustion gases therefore introduce different heat loads three dimensionally over the turbine vanes and blades, which heat loads are additionally affected by the rotation of the turbine blades.

Accordingly, the prior art in turbine vane and blade cooling is replete with different configurations for vane and blade cooling. The internal cooling circuits of the airfoils have myriad configurations for distributing the limited cooling air for maximizing cooling effectiveness thereof over the different parts of the airfoil.

Blade cooling must be effected with minimum use of air bled from the compressor which bleed air correspondingly decreases performance and efficiency of the turbine engine.

However, the airfoils must be adequately cooled for obtaining a long useful life before experiencing undesirable thermal distress.

The various cooling holes found for the turbine airfoils also have a myriad of configurations and patterns for cooling the different portions of the airfoil differently against the corresponding heat loads from the combustion gases. For example, the typical film cooling hole is a relatively simple, inclined cylindrical hole which may be economically formed by laser drilling.

However, the cylindrical hole emits a jet of spent cooling air that is subject to the varying differential pressure with the external combustion gases. Each film cooling hole must have a suitable backflow margin to prevent ingestion of the combustion gases into the airfoil, but the backflow margin cannot be excessive or the discharge jet will separate from the external surface and reduce efficiency of the film cooling.

Accordingly, a more complex film cooling hole has a diverging configuration for diffusing the discharge cooling air to reduce its velocity and promote improved film cooling. The typical diffusion film cooling hole typically requires electrical discharge machining (EDM) with a correspondingly shaped electrode that significantly increases the time and cost of manufacture.

Accordingly, diffusion film cooling holes are avoided when possible, and are typically used in isolated columns for enhanced film cooling. Diverging diffusion holes therefore join the other types of dedicated cooling holes in a turbine airfoil available to the blade designer during development.

Modern gas turbine engine turbine airfoil design is therefore quite mature and sophisticated and provides the designer with a multitude of options in developing a modern turbine airfoil for the hostile environment of the turbine stages in which combustion gas temperature is ever driven upward for increasing efficiency of the engine. The typical dilemma facing the designer is the selection of the fewest cooling holes with the simplest configuration for the different parts of the turbine airfoil for obtaining acceptable cooling thereof with minimal air bled from the compressor for maximizing airfoil life.

Modern gas turbine engines have benefited from the continual development of turbine airfoil cooling, with further improvements nevertheless continuing in small but significant changes. Modern turbine airfoils may achieve years of service with thousands of hours of operation in remarkably long service life before experiencing undesirable thermal distress and the need for replacement thereof.

For example, one modern turbofan engine has enjoyed decades of successful commercial public use in the United States and other countries, for powering commercial aircraft in flight. A first stage turbine rotor blade is found in this exemplary turbofan engine that has undergone continual development over the engine program, and itself has enjoyed many years of operation with thousands of hours of service without thermal distress.

However, this long useful life of actual turbine blades in extended service has led to the discovery of localized thermal distress at the end of that long life. This parent turbine blade has been in public use and on sale for many years in the U.S. and abroad, and forms the basis for further improvement thereof as described hereinbelow.

Accordingly, it is desired to provide a turbine airfoil having further improved cooling for addressing this recently discovered thermal distress and further increasing the useful life thereof.

BRIEF DESCRIPTION OF THE INVENTION

A hollow turbine airfoil includes pressure and suction sidewalls extending in span between a root and tip and extending in chord between opposite leading and trailing edges. The pressure sidewall includes a first pattern of first holes distributed in span and chord over a majority thereof, and a second pattern of different second holes also distributed in span and chord over a minority of the pressure sidewall between the tip and the midspan of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
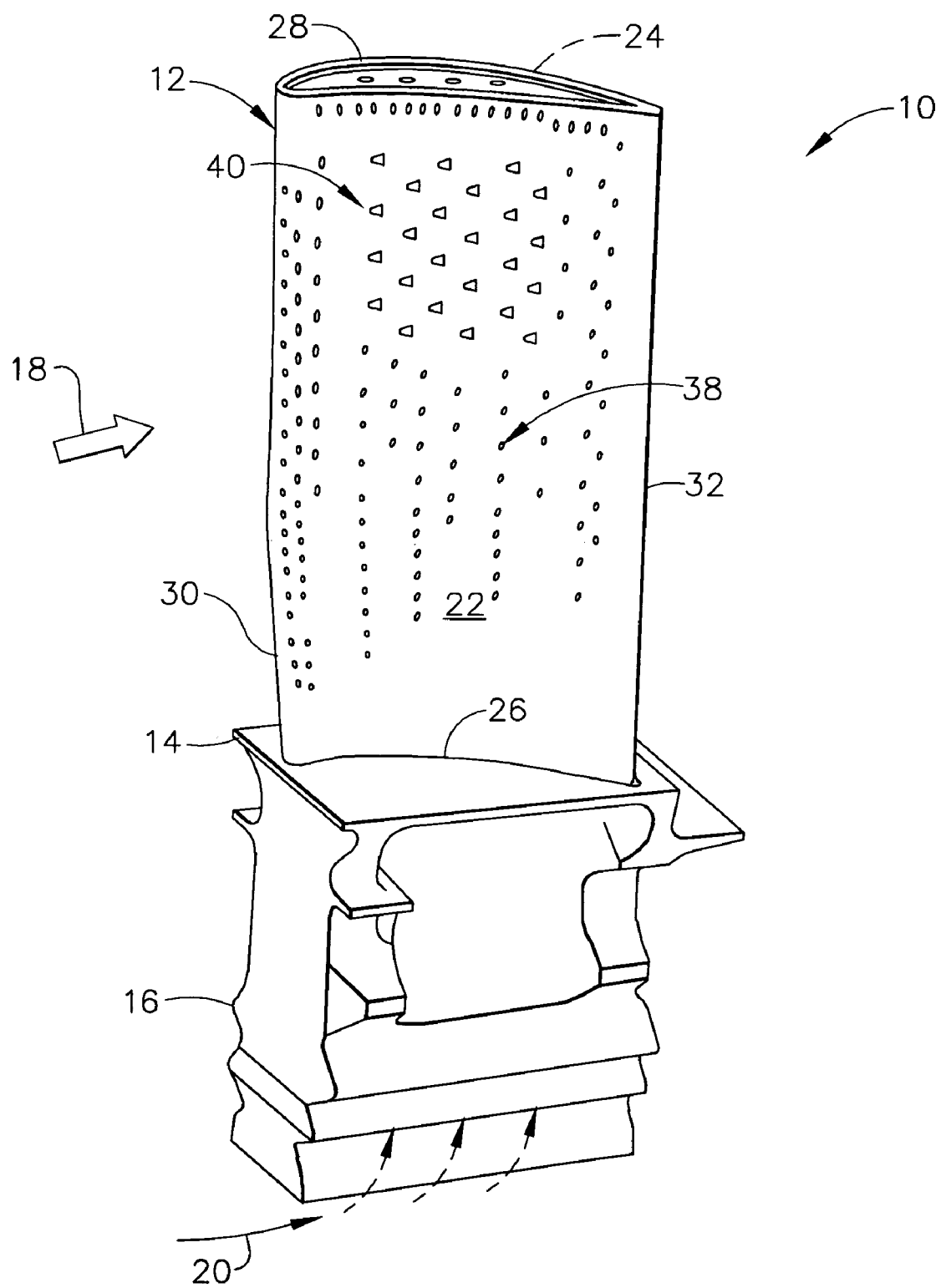
FIG. 1 is an isometric elevational view of an exemplary first stage turbine rotor blade.

Illustrated in FIG. 1 is an exemplary, first stage turbine rotor blade 10 for use in a gas turbine engine. The blade includes an airfoil 12, platform 14, and supporting dovetail 16 formed in a unitary configuration by casting. The platform defines a radially inner boundary for hot combustion gases 18 generated in an upstream combustor (not shown) which flow axially downstream over the airfoil 12 during operation.

The airfoil 12 is hollow for receiving a cooling air coolant 20 through corresponding inlets in the base of the dovetail 16 for cooling the blade during operation. The dovetail 16 is configured with supporting lobes or tangs that mate with a corresponding dovetail slot in the perimeter of a supporting rotor disk (not shown) from which the blade extends radially outwardly in the engine.

The disk includes a full row or complement of the blades 10 for extracting energy from the combustion gases for rotating the disk and in turn powering the compressor (not shown) of the engine which produces the pressurized cooling air 20. Most of the air pressurized in the compressor is mixed with fuel in the combustor for generating the hot combustion gases 18, and a small portion of the pressurized air is bled from the compressor for cooling the row of turbine blades.

The airfoil 12 includes a generally concave pressure sidewall 22, and a circumferentially opposite, generally convex suction sidewall 24 extending in radial or longitudinal span from a radially inner root 26 where the proximal end of the airfoil meets the platform 14, to a radially outer tip 28 at the opposite distal end of the airfoil. The two sidewalls 22,24 also extend axially in chord between opposite leading and trailing edges 30,32.

Figure 2:
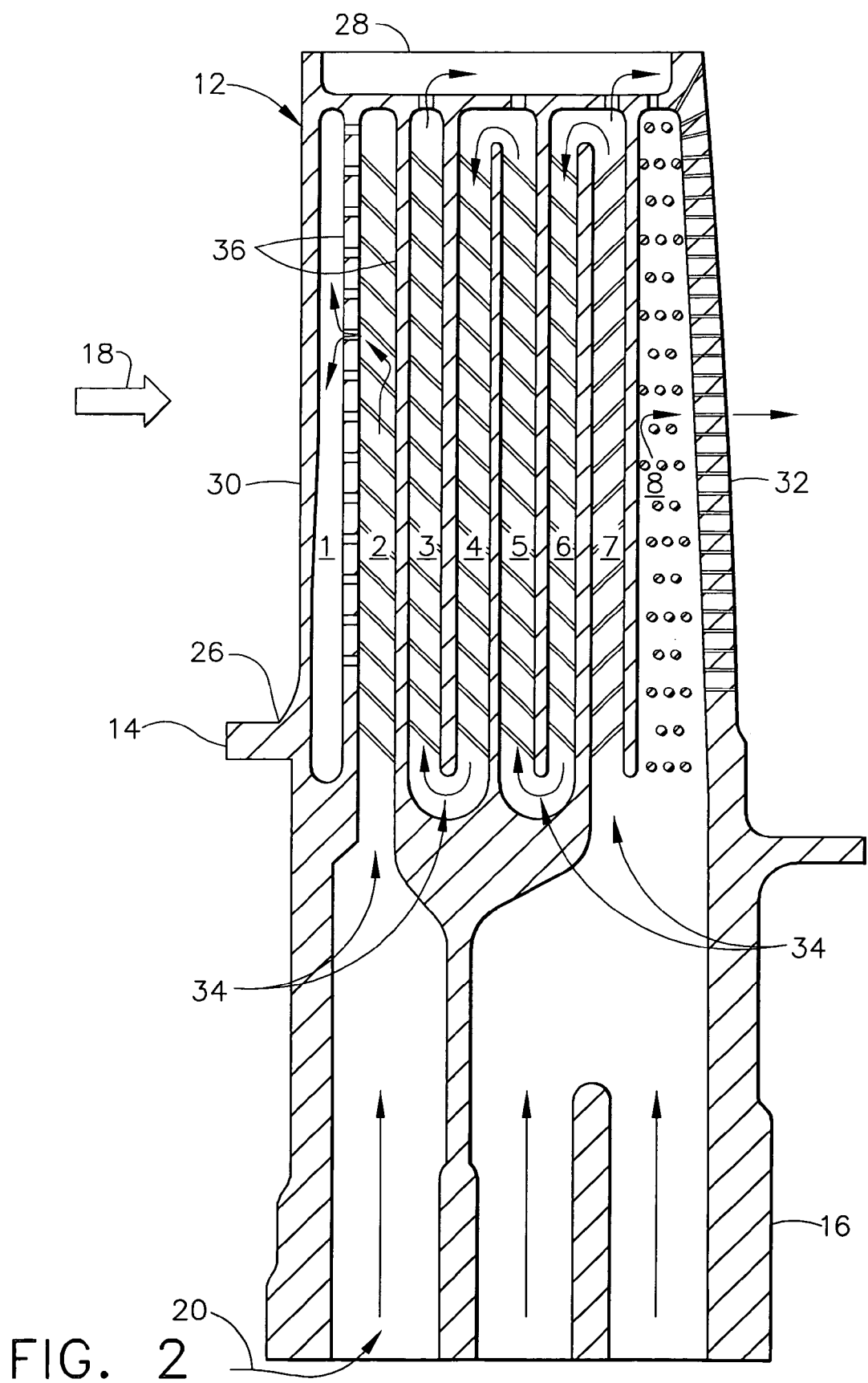
FIG. 2 is an elevational sectional view through the blade illustrated in FIG. 1.

The hollow blade illustrated in FIG. 1 is shown split in section in FIG. 2 and includes an internal cooling circuit 34 for channeling the pressurized air coolant 20 radially outwardly therethrough during operation. The two sidewalls of the airfoil are spaced circumferentially or transversely apart between the leading and trailing edges and are joined together by a plurality of chordally spaced apart internal partitions or bridges 36 which extend radially in span to define corresponding channels 1–8 of the cooling circuit 34.

Figure 3:
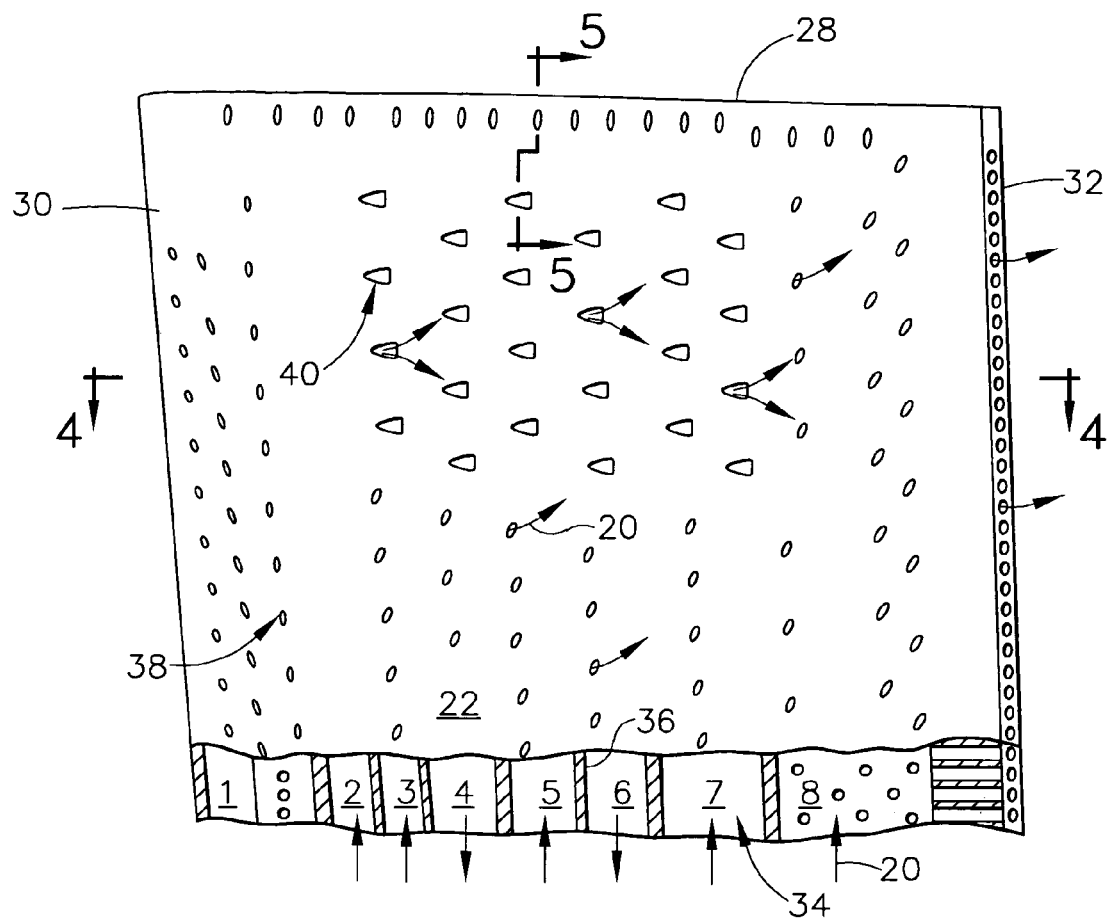
FIG. 3 is an enlarged, partly sectional view of the outer portion of the airfoil illustrated in FIG. 1.

The pressure sidewall 22 is illustrated in full in FIG. 1, and in FIG. 3 the radially outer portion thereof is shown enlarged. The pressure sidewall includes a first two dimension (2D) pattern of first cooling holes 38, and a complementary second 2D pattern of second cooling holes 40 extending transversely therethrough in flow communication with the internal cooling circuit 34 for discharging the coolant 20 during operation.

The first pattern of first holes 38 is distributed in longitudinal span between the airfoil root 26 at the platform 14 and at least the midspan of the airfoil. The first pattern is distributed also in axial chord between the opposite leading and trailing edges 30,32 and provides a 2D pattern over a majority of the external surface area of the pressure sidewall.

Correspondingly, the second pattern of second cooling holes 40 is different than the first pattern, and is distributed in span and chord between the midspan and the distal tip 28 of the airfoil over a minority of the external surface area of the pressure sidewall in a preferential bilevel arrangement with the first pattern.

The multitude of first and second holes 38,40 are different forms of film cooling holes strategically distributed over the span and chord of the pressure sidewall to improve the film cooling thereof and address the thermal distress discovered in the parent blade due to extended use of this type of turbine blade in years of commercial service.

The first holes 38 are preferably straight cylindrical film cooling holes that may be quickly and economically manufactured by conventional laser drilling.

In contrast, the second cooling holes 40 are preferably more complex diffusion holes that diverge or increase in flow area between the inlet and outlet thereof. The second holes 40 may be formed using a corresponding EDM electrode matching the diverging configuration of the holes, and correspondingly increases fabrication time and cost.

However, the increased fabrication time and cost may be limited by limiting the number of second holes specifically located near the airfoil tip for locally improving cooling in the specific region of the discovered thermal distress.

As best shown in FIG. 3, the pattern of second holes 40 is preferably disposed between the leading and trailing edges 30,32 of the pressure sidewall 22 within or inside at least the outer portion of the pattern of the first holes 38. The pattern of second holes 40 is discrete and isolated from the first holes 38 and is not commingled with the individual holes thereof.

Correspondingly, the pattern of first holes 38 laterally surrounds the outer perimeter of the pattern of second holes 40 along all four sides thereof including the leading edge 30, the trailing edge 32, the tip 28, and the midspan region of the airfoil. In this way, most of the exposed cooling holes in the pressure sidewall, as well as in the suction sidewall, of the airfoil may be relatively inexpensive cylindrical film cooling holes arranged in a conventional manner for conventional performance.

For example, the basic turbine blade 10 illustrated in FIG. 1 is representative of the exemplary parent turbine blade disclosed above in the Background section which has enjoyed years of commercial use in the United States and foreign countries, but is specifically modified as disclosed herein for further enhancing life thereof by addressing the discovered thermal distress.

The pattern of second holes 40 are new to the blade and replace additional cylindrical film cooling holes previously used in years of commercial service in the parent turbine blade. The pattern of new second holes 40 is specifically located and configured and modifies the first pattern of first holes 38 in the vicinity thereof as further described hereinbelow.

Accordingly, but for the introduction of the second pattern of second holes 40 in the turbine blade, that blade is otherwise conventional in its entirety, with years of successful commercial use in the United States and abroad in the parent thereof.

The cylindrical first holes 38 in the first pattern thereof include columns of conventional showerhead holes around the leading edge 30 of the airfoil for dedicated cooling thereof. The first pattern also includes additional columns of the first holes on the pressure sidewall along the trailing edge aft of the second pattern. Additional columns of the first holes are also found below the pattern of second holes 40 extending inwardly toward the platform but terminating at different heights between the leading and trailing edges where not required.

Furthermore, the first holes 38 also extend in an axial or chordal row along the airfoil tip 28 outboard or above the pattern of second holes 40. This row of first holes 38 provides dedicated cooling of the small squealer rib on the pressure side of the airfoil that extends outwardly from the tip floor bounding the top of the internal cooling circuit 34.

The tip floor itself as shown in FIGS. 1 and 2 may include additional cooling holes extending perpendicularly therethrough for receiving a portion of the cooling air from inside the airfoil to fill the tip cavity and provide additional cooling of the airfoil tip and squealer ribs.

The suction side of the airfoil may have any conventional pattern of cooling holes therein such as those found in the parent blade described above. And, the trailing edge 32 includes a conventional row of cylindrical cooling holes extending axially therethrough and terminating in the trailing edge itself between the pressure and suction sidewalls.

The second pattern of second holes 40 illustrated in FIG. 3 is indicative of the regions of thermal distress experienced in the parent blade. For example, thermal distress was observed in the original first pattern immediately aft of the illustrated second pattern of cooling holes. And, additional thermal distress was observed forward thereof within the region of the new second pattern itself.

Accordingly, the pattern of second holes 40 is now being introduced in the pressure sidewall to replace a minor portion of the original first pattern of cylindrical holes for enhancing pressure side cooling of the airfoil in about the top 25 percent of the span thereof.

Correspondingly, one object of the improved turbine blade is to locally improve cooling thereof in the experienced distress regions of the parent blade identified above, but without reducing cooling performance of the remainder of the airfoil and without increasing or significantly increasing the total amount of air bled from the compressor for cooling the turbine blade.

It is recognized that the full complement of cooling holes throughout the entire turbine blade are fed from a common source of pressurized air through the dovetail thereof. Redistributing a limited quantity of cooling air provided in each turbine blade therefore could affect cooling performance throughout the blade.

As initially shown in FIG. 1, most of the first holes 38 are arranged in a plurality of vertical rows or columns spaced apart chordally in parallel along the span of the airfoil in substantially linear columns. Correspondingly, the newly introduced second holes 40 are similarly arranged in most part in a plurality of vertical columns and chordally spaced apart in parallel along the outer span in linear columns thereof, which are in most part substantially colinear or in-line with corresponding columns of the first holes 38.

Figure 4:
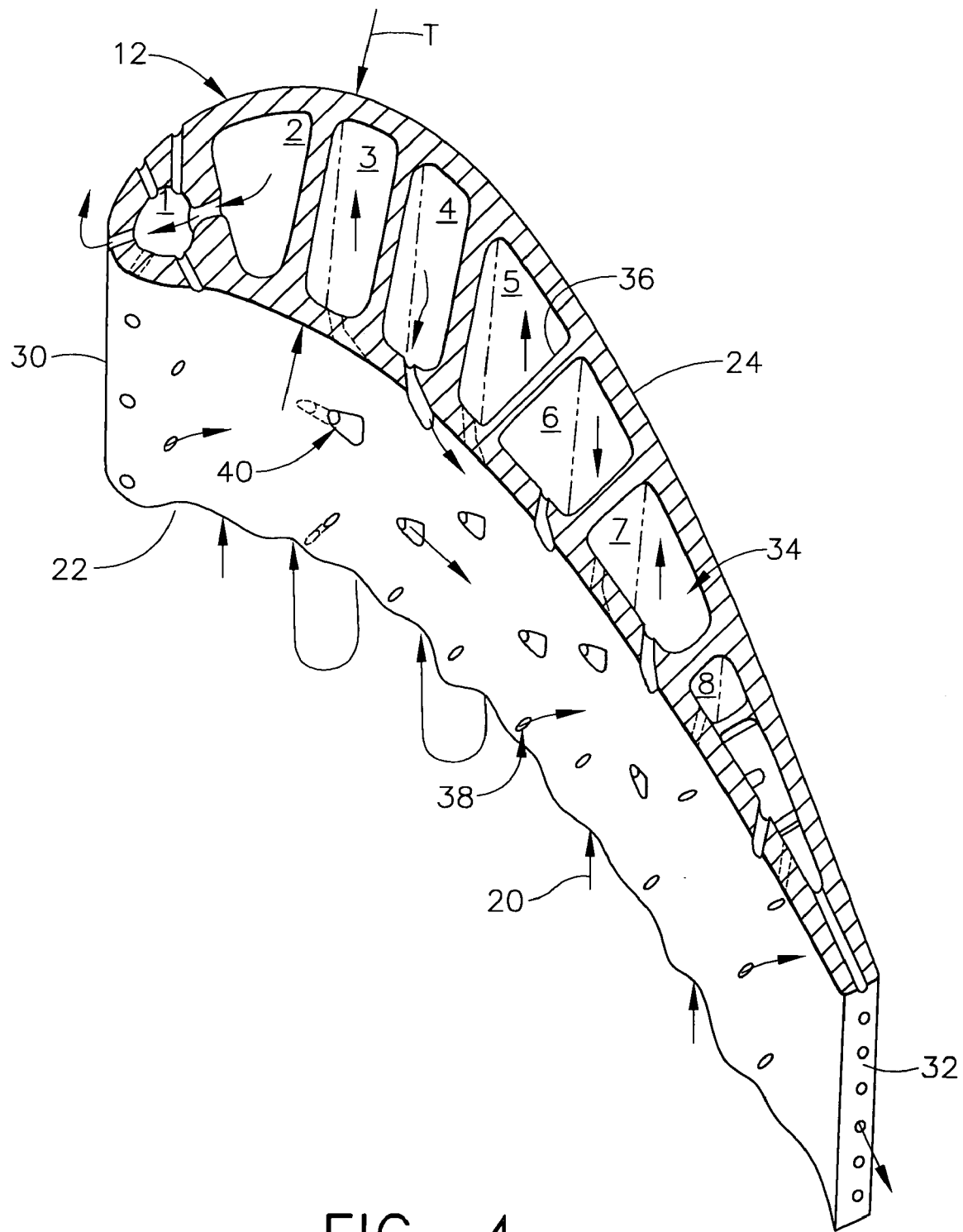
FIG. 4 is a radial sectional and isometric view of the airfoil illustrated in FIG. 3 and taken generally along line 4—4.

All of the various cooling holes in the airfoil receive their cooling air from the internal cooling circuit 34 as illustrated in FIGS. 2–4. The cooling circuit 34 itself may have any conventional configuration such as that found in the parent blade identified above. For example, the circuit includes a plurality of radial legs or channels 1–8 extending longitudinally in span between the root 26 and tip 28 of the airfoil and spaced apart along the chord between the leading and trailing edges and separated by the longitudinal partitions 36.

As shown in FIG. 2, some of the partitions 36 extend radially inwardly from the tip floor of the airfoil to the platform, whereas other partitions extend radially outwardly from the platform to just short of the tip floor. The cooling circuit 34 extends radially inwardly through the platform and dovetail to three corresponding inlets in the base of the dovetail which receive in parallel the cooling air 20 from the compressor.

As shown in FIG. 4, the airfoil 12 initially diverges or increases in thickness T aft from the leading edge 30 to a maximum thickness near the second partition, and then tapers or converges in thickness aft to the relatively thin trailing edge 32 in the typical aerodynamic shape of the parent blade. The eight channels of the cooling circuit 34 are numbered sequentially from the leading edge to the trailing edge, with the airfoil maximum thickness occurring near the third channel 3.

As shown in FIGS. 3 and 4, the second pattern of second holes 40 preferably commences near or at the maximum thickness of the airfoil at the third channel 3, and terminates in the axial or chord direction forward of the trailing edge 32 in the penultimate one of the channels 7.

The internal cooling circuit 34 illustrated in FIG. 2 includes a pair of forward channels 1,2 disposed behind the leading edge 30 for impingement cooling thereof. For example, the intervening partition between the first two channels includes a column of impingement holes that direct the coolant from the second channel in impingement against the back side of the leading edge in the first channel for impingement cooling thereof. The second channel has a dedicated inlet in the base of the dovetail.

The cooling circuit also includes a plurality of midchannels 3–7 disposed behind or aft of the forward channels 1,2 in a multipass serpentine configuration. The five channels 3–7 commence at the seventh channel 7 with a corresponding inlet in the base of the dovetail and channel the cooling air from the trailing edge toward the leading edge in five serpentine legs terminating in the third channel 3.

The aft channel 8 is disposed behind the mid-channels 3–7 directly in front or forward of the trailing edge 32 and has another inlet at the base of the dovetail for channeling the cooling air through the column of trailing edge cooling holes.

As indicated above, the internal cooling circuit 34 is itself conventional in the parent blade and provides a preferred distribution of the limited cooling air through the eight channels over the entire sidewalls of the airfoil. The various channels may have conventional turbulators for enhancing heat transfer therein, and the eighth channel 8 has a multitude of cylindrical pins bridging the two sidewalls for enhancing cooling of the thin trailing edge. The tip floor includes several cooling holes which discharge a portion of the internal cooling air into the tip cavity as described above.

As shown in FIGS. 3 and 4, the second pattern of second holes 40 preferably commences in flow communication with the third flow channel 3 at the maximum thickness of the airfoil, which third channel is the last leg in the 5-pass serpentine configuration.

In the preferred embodiment, the plurality of columns of the second holes 40 are disposed in flow communication with corresponding ones of the flow channels 3–7 of the serpentine configuration. In this way, the different columns of second holes are independently fed from the different serpentine channels 3–7.

Most of the first holes 38 as illustrated in FIGS. 3 and 4 are inclined in a conventional manner transversely through the pressure sidewall 22 at a shallow inclination angle of above 15 to 20 degrees for maximizing performance of the film cooling air discharged therefrom, and with an acceptable backflow margin and reduced tendency for undesirable lift-off or separation of the film from the surface. The first holes 38 are preferably straight, cylindrical holes, formed by laser drilling for example, and oval or elliptical inlets will be formed inside the cooling circuit along the internal surface of the pressure sidewall, with oval or elliptical outlets being formed on the external surface of the pressure sidewall as evident in the several figures.

Correspondingly, the second holes 40 are similarly inclined through the pressure sidewall 22, with smaller inlets on the internal surface of the pressure sidewall and larger, diverging outlets on the external surface of the pressure sidewall. The individual second holes 40 may have any conventional configuration for shaped diffusion holes, with typically straight constant area inlets diverging or increasing in flow area to the outlets terminating on the external surface of the pressure sidewall;

The inlets may be cylindrical or rectangular as desired, and the outlets of the second holes 40 typically diverge symmetrically at small half-angles for increasing the flow area in the downstream direction. Diffusion requires shallow divergence of the outlet to minimize or prevent undesirable flow separation for allowing the cooling air to decrease in velocity while increasing pressure thereof.

Diffusion holes, such as the second holes 40, are conventional in configuration and known to enhance film cooling, but are more complex in shape and more costly to produce, by EDM machining for example.

However, the second holes 40 are selectively introduced in the otherwise conventional turbine blade for specifically addressing the experienced thermal distress on the pressure side in the outer span of the airfoil. The second holes 40 are therefore limited in number and placement, and in general replace corresponding cylindrical holes in the parent blade.

More specifically, the first five columns of second holes 40 shown in FIG. 3 replace cylindrical holes in the corresponding five columns of first holes 32 previously found in the parent blade. The first column of second holes 40 is disposed in flow communication with the third channel 3 in colinear alignment with the first holes 38 therebelow. The first column includes four second holes 40 replacing five cylindrical holes in the parent, which commonly have an inlet diameter of about 15 mils (0.38 mm) for similarly metering the air discharged therethrough.

The second column also has four second holes 40 correspondingly fed by the fourth channel 4 in colinear alignment with the first holes 38 therebelow. The four second holes 40 replace five cylindrical holes in the parent blade and have common inlet diameters of about 13 mils (0.33 mm) for metering discharge flow therethrough.

The third column of second holes 40 is fed by the fifth channel 5 in colinear alignment with the column of first holes 38 therebelow. The third column includes four second holes 40 which replace six cylindrical holes in the parent, all having a common inlet diameter like the previous row.

Similarly, the fourth and fifth columns of second holes 40 are correspondingly fed by the sixth and seventh channels 6,7 and are colinear in alignment with the corresponding columns of the first holes 38. The fourth and fifth columns include four second holes 40 each which similarly replace six cylindrical holes in each of the columns of the parent blade, and have similar inlet diameters as in the previous columns for metering the coolant flow.

In the first five columns of the second holes 40 the number thereof is reduced over the corresponding columns in the parent blade in view of the improved cooling performance of the diffusion holes 40 over the cylindrical holes 38, and the different flow characteristics thereof. The reduced number of second holes 40 in these columns permits optimization of the specific location thereof along both the span and chord while remaining generally in line with the corresponding columns of the first holes 38 all fed by the corresponding channel 3–7.

The additional surface area available for the fewer number of second holes 40 also permits these holes in their corresponding columns to alternate or stagger in longitudinal position along the span between adjacent columns thereof as shown in FIG. 3. In this way, the film cooling air discharged from the second holes 40 in each column thereof is spread laterally along the span of the airfoil and continues downstream toward the trailing edge for enhancing film cooling coverage both within the second pattern of holes 40 as well as downstream therefrom to the thin trailing edge.

In the preferred embodiment illustrated in FIGS. 1 and 3, the first pattern of first holes 38 is multidirectional in a primarily conventional manner as found in the parent blade for best matching the local direction of the combustion gas streamlines as they flow downstream over the rotating blade during operation. In contrast, the second pattern of second holes 40 is preferably unidirectional, and preferably in the axial downstream direction.

Figure 5:
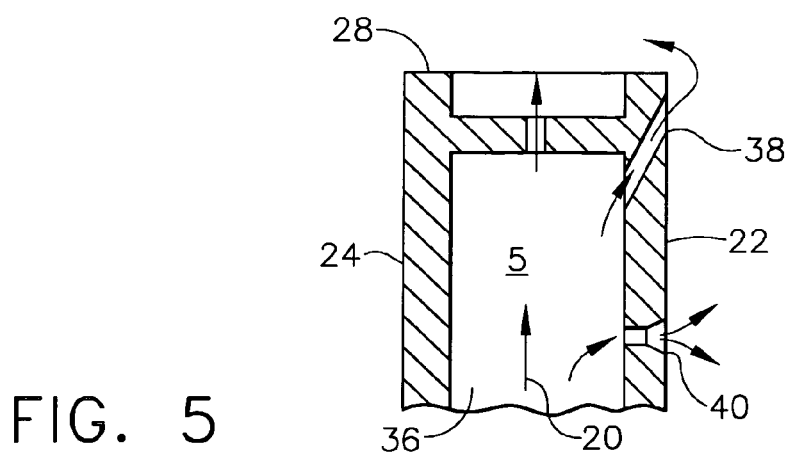
FIG. 5 is a transverse elevational sectional view through the airfoil illustrated in FIG. 3 and taken along line 5—5.

As shown in FIGS. 4 and 5, the first holes 38 are inclined primarily radially along the span with a small component of axial inclination along the chord for compound inclination thereof resulting in oval outlets whose major axes extend primarily radially.

Correspondingly, the second holes 40 are inclined primarily or substantially axially only along the chord direction with little, if any, inclination in the radial direction. In an alternate embodiment, the second holes 40 could have compound inclination if beneficial to cooling the airfoil against the particular pattern of combustion gases streamlines as determined by further investigation or experience.

Each diffusion hole 40 as illustrated in FIGS. 4 and 5 has the typical constant area inlet fed by the internal cooling channel, with an outlet that diverges laterally along the span of the airfoil, with a back wall further inclined at a more shallow angle than the inclination angle of the inlet. In this way, the second holes 40 both diffuse the cooling air discharged therethrough as well as provide a shallower discharge angle with the external surface of the airfoil for enhancing the film of cooling air spread downstream therefrom.

Since the improved turbine airfoil illustrated in FIG. 3 is a modification of the parent blade, the diffusion second holes 40 cannot be directly substituted for the differently configured cylindrical first holes 38. As indicated above, one difference is the difference in number of second holes 40 substituted for the cylindrical film cooling holes in the parent blade. Another difference is the local position and pitch along the span of the second holes 40 in the corresponding columns of the first holes 38.

Another difference is in the introduction of the second holes 40 near the thin trailing edge of the airfoil. Whereas each of the first four columns of the second holes 40 is disposed in flow communication with a respective one of the four channels 3–6, the last two columns of second holes 40 before the trailing edge 32 are the exception, with both columns being commonly joined in flow communication with the same, seventh channel 7.

As shown in FIG. 3, the first five columns of second holes 40, which includes the penultimate column, are disposed colinearly in radial alignment above corresponding columns of the first holes 38, and in corresponding flow communication with the five channels 3–7.

However, the last column of second holes 40 closest to the trailing edge is offset in a new or added row having no counterpart in the parent blade in the axial or chord direction between the next two adjacent columns of first holes 38 forward and aft thereof. The sixth column of second holes 40 therefore introduces four more holes having similar inlet flow areas as in the preceding columns thereof which offset the reduction in total number of cylindrical holes being replaced by the diffusion holes.

Accordingly, twenty-eight cylindrical holes are removed from the parent blade and substituted by twenty-four diffusion holes with matching inlet metering areas to ensure substantially the same amount of total cooling air being used by the individual turbine blades. The two types of holes 38,40 are configured differently and perform differently and meter the cooling air therethrough differently, yet the selective replacement of cylindrical holes with diffusion holes locally enhances cooling effectiveness in the experienced distress regions of the airfoil without compromising cooling performance in the remainder of the airfoil, and without significantly changing the overall amount of cooling air required for each turbine blade.

Since the last two columns of second holes 40 are commonly fed by the seventh flow channel 7 as illustrated in FIG. 3, the placement of the individual holes thereat may be optimized in span and chord to specifically address the experienced thermal distress in this local region.

Correspondingly, the column of first holes 38 disposed immediately aft of the last column of the second holes 40 may be also modified to complement the adjoining pattern of second holes. For example, the column of first holes 38 immediately following the second pattern may be nonlinear along the span of the airfoil, with an outer portion extending in span behind the second pattern to the airfoil tip, and an inner portion extending below the second pattern to below the airfoil midspan. The outer and inner portions or segments of this nonlinear column of first holes 38 may then be offset in chord from each other in two straight colinear portions staggered from each other.

Accordingly, the turbine rotor blade illustrated in FIG. 1 may be otherwise conventional in the form of the parent blade for enjoying the long useful life thereof, while being specifically modified locally in the outer span thereof for improving cooling in the experienced thermal distress regions for further increasing the blade useful life.

The improved blade may be used in a new engine or as a retrofit in an existing engine using substantially the same amount of total cooling airflow thereto with an enhanced redistribution thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine rotor blade comprising:
a unitary airfoil, platform, and supporting dovetail; and
said airfoil being hollow between opposite pressure and suction sidewalls, with said pressure sidewall including a first pattern of film cooling first holes distributed in span between said platform and a midspan of said airfoil, and distributed in chord between opposite leading and trailing edges, and a different second pattern of different diffusion second holes distributed in span and chord between said midspan and a distal tip of said airfoil.

2. A blade according to claim 1 wherein:
said first holes comprise a plurality of columns along said span; and
said second holes comprise a plurality of columns substantially colinear therewith.

3. A blade according to claim 2 wherein:
said internal cooling circuit comprises a plurality of channels extending in span between said root and tip and spaced apart along said chord;
said airfoil-initially increases in thickness aft from said leading edge to a maximum thickness, and then converges aft to a thin trailing edge, and
said second pattern of second holes commences near said maximum thickness at one of said channels, and terminates forward of said trailing edge in another one of said channels.

4. A blade according to claim 3 wherein:
said first holes are in most part inclined through said pressure sidewall and have oval outlets on the external surface of said pressure sidewall; and
said second holes are inclined through said pressure sidewall and have diverging outlets on the external surface of said pressure sidewall.

5. A blade according to claim 4 wherein said second holes in said columns alternate in position along said span between adjacent columns thereof.

6. A blade according to claim 5 wherein said first holes further comprise a plurality of columns along said leading edge forward of said second pattern, a plurality of columns along said trailing edge aft of said second pattern, and a row extending along said tip outboard of said second pattern.

7. A blade according to claim 5 wherein said first holes are inclined primarily along said span, and said second holes are inclined primarily along said chord.

8. A blade according to claim 5 wherein said first pattern of first holes is multidirectional, and said second pattern of second holes is unidirectional.

9. A blade according to claim 5 wherein said internal cooling circuit comprises:
a pair of forward channels disposed behind said leading edge for impingement cooling thereof;
a plurality of mid-channels disposed behind said forward channels in a multipass serpentine configuration, with said second holes commencing therein; and
an aft channel disposed behind said mid-channels forward of said trailing edge.

10. A blade according to claim 9 wherein:
each of said columns of second holes is disposed in flow communication with a respective one of said channels, except for the last two columns before said trailing edge which are both joined in flow communication with a common one of said channels; and
the penultimate column of said second holes is colinear above a corresponding column of said first holes, and the last column of second holes is offset in chord between the next two adjacent columns of said first holes.

11. A turbine airfoil comprising:
opposite pressure and suction sidewalls extending in span between a root and tip and in chord between opposite leading and trailing edges, and spaced apart transversely to define an internal cooling circuit for channeling a cooling air coolant therein;
said pressure sidewall including a first pattern of cylindrical film cooling first holes extending therethrough in flow communication with said internal circuit, and distributed in span and chord over a majority of said pressure sidewall; and
said pressure sidewall further including a second pattern of diverging diffusion second holes extending in flow communication with said internal circuit, and distributed in span and chord over a minority of said pressure sidewall between said tip and the midspan of said airfoil.

12. An airfoil according to claim 11 wherein said second pattern of second holes is disposed between said leading and trailing edges inside said first pattern of first holes.

13. An airfoil according to claim 12 wherein said first pattern of first holes laterally surrounds said second pattern of second holes along said leading edge, trailing edge, tip, and midspan.

14. An airfoil according to claim 13 wherein:
said first holes comprise a plurality of columns along said span; and
said second holes comprise a plurality of columns substantially colinear therewith.

15. An airfoil according to claim 14 wherein said first holes further comprise a plurality of columns along said leading edge forward of said second pattern, a plurality of columns along said trailing edge aft of said second pattern, and a row extending along said tip outboard of said second pattern.

16. An airfoil according to claim 15 wherein:
said internal cooling circuit comprises a plurality of channels extending in span between said root and tip and spaced apart along said chord;
said airfoil initially increases in thickness aft from said leading edge to a maximum thickness, and then converges aft to a thin trailing edge, and
said second pattern of second holes commences near said maximum thickness at one of said channels, and terminates forward of said trailing edge in a penultimate one of said channels.

17. An airfoil according to claim 16 wherein said internal cooling circuit comprises:
a pair of forward channels disposed behind said leading edge for impingement cooling thereof;

a plurality of mid-channels disposed behind said forward channels in a multipass serpentine configuration, with said second holes commencing therein; and an aft channel disposed behind said mid-channels forward of said trailing edge.

18. An airfoil according to claim 15 wherein:

said first holes are in most part inclined through said pressure sidewall and have oval outlets on the external surface of said pressure sidewall; and said second holes are inclined through said pressure sidewall and have diverging outlets on the external surface of said pressure sidewall.

19. An airfoil according to claim 18 wherein said first holes are inclined primarily along said span, and said second holes are inclined primarily along said chord.

20. An airfoil according to claim 18 wherein said first pattern of first holes is multidirectional, and said second pattern of second holes is unidirectional.

21. An airfoil according to claim 18 wherein said second holes in said columns alternate in position along said span between adjacent columns thereof.

22. An airfoil according to claim 18 wherein said internal cooling circuit includes a plurality of channels spaced apart between said leading and trailing edges, and said columns of second holes are disposed in flow communication with corresponding ones of said channels.

23. An airfoil according to claim 22 wherein each of said columns of second holes is disposed in flow communication with a respective one of said channels, except for the last two columns before said trailing edge which are both joined in flow communication with a common one of said channels.

24. An airfoil according to claim 23 wherein the penultimate column of said second holes is colinear above a corresponding column of said first holes, and the last column of second holes is offset in chord between the next two adjacent columns of said first holes.

25. An airfoil according to claim 24 wherein a column of said first holes is disposed immediately aft of said last column of second holes, and extends in span below said midspan in two straight portions offset in chord from each other.

* * * * *